United States Patent
Chao

(10) Patent No.: US 8,547,466 B2
(45) Date of Patent: Oct. 1, 2013

(54) UNLOCKING METHOD OF A TOUCH SCREEN AND ELECTRONIC DEVICE WITH CAMERA FUNCTION THEREOF

(75) Inventor: Chih-Yi Chao, Hsinchu (TW)

(73) Assignee: Altek Corporation, Hsinchu (TW)

( * ) Notice: Subject to any disclaimer, the term of this patent is extended or adjusted under 35 U.S.C. 154(b) by 172 days.

(21) Appl. No.: 12/916,081

(22) Filed: Oct. 29, 2010

(65) Prior Publication Data

US 2012/0069231 A1    Mar. 22, 2012

(30) Foreign Application Priority Data

Sep. 21, 2010  (TW) ............................... 99132115 A

(51) Int. Cl.
*H04N 5/222* (2006.01)
*G06F 3/033* (2013.01)
*G06F 3/14* (2006.01)

(52) U.S. Cl.
USPC ............. 348/333.01; 348/333.02; 715/863; 715/864

(58) Field of Classification Search
None
See application file for complete search history.

(56) References Cited

U.S. PATENT DOCUMENTS

| | | | |
|---|---|---|---|
| 2010/0001967 A1* | 1/2010 | Yoo | 345/173 |
| 2010/0017872 A1* | 1/2010 | Goertz et al. | 726/16 |
| 2010/0162182 A1* | 6/2010 | Oh et al. | 715/863 |
| 2010/0306693 A1* | 12/2010 | Brinda | 715/784 |
| 2010/0306718 A1* | 12/2010 | Shim et al. | 715/863 |
| 2011/0041102 A1* | 2/2011 | Kim | 715/863 |
| 2011/0316797 A1* | 12/2011 | Johansson | 345/173 |
| 2012/0009896 A1* | 1/2012 | Bandyopadhyay et al. | 455/411 |
| 2012/0053887 A1* | 3/2012 | Nurmi | 702/150 |
| 2012/0060128 A1* | 3/2012 | Miller et al. | 715/863 |
| 2012/0223890 A1* | 9/2012 | Borovsky et al. | 345/173 |

* cited by examiner

*Primary Examiner* — Lin Ye
*Assistant Examiner* — John H Morehead, III
(74) *Attorney, Agent, or Firm* — Che-Yang Chen; Law Office of Michael Chen

(57) ABSTRACT

An unlocking method of a touch screen and an electric device with camera function thereof are disclosed. A camera module is used for capturing a plurality of images. A touch screen shows an application function icon, a shooting mode icon, an activate area and a slide path connecting the icons and the activate area while the touch screen is locked. A processing module is electrically connected with the camera module and the touch screen. While detecting that the application function icon or the shooting mode icon is dragged to the activate area through the slide path, the processing module transmits an unlocking signal to the touch screen. The touch screen unlocks according to the unlocking signal and shows a screen of application function operation or a screen of camera function. Therefore, users would feel more convenient than before while using an electric device with camera function.

8 Claims, 9 Drawing Sheets

UNLOCKING METHOD OF A TOUCH SCREEN AND ELECTRONIC DEVICE WITH CAMERA FUNCTION THEREOF

FIELD OF THE INVENTION

The exemplary embodiment(s) of the present invention relates to an unlocking method of a screen and an electronic device thereof. More specifically, the exemplary embodiment(s) of the present invention relates to an unlocking method of a touch screen and an electronic device with camera function thereof.

BACKGROUND OF THE INVENTION

With the development of technology, a variety of electronic devices have become an indispensable part in everyone's daily life. Although the development of technology makes our life more convenient than before, many electronic devices are not user-friendly. For example, the touch screen of the electronic device, such as the cell phone and PDA, switches to a sleep mode or a locking mode after the electronic device stands idle in a period of time. Hence, the electronic device would not consume any unnecessary power and would not be operated by an accident touch of a user. When a user wants to use a certain function of the electronic device and the electronic device is in the locking mode, the user needs to unlock the touch screen to activate the electronic device.

There are many methods to unlock the touch screen. For example, a user may slide laterally or vertically on the touch screen, slide on the touch screen with a specific slide path, or key in a specific password to unlock and activate the touch screen. However, a user can not directly use the specific function after unlocking the touch screen and need to click many different icons under different function layers to start the desired function. That is, a user can not directly access the interface of the desired function according to the user's habit after unlocking the touch screen. For example, when a user wants to listen to music or take pictures, the user may need to unlock the touch screen through one of the unlocking methods mentioned above at first. Then, a user may click many different icons in different function layers to enable the application. This is not convenient. Therefore, to design an ideal unlocking method of a touch screen and an electronic device with camera function thereof has become a popular issue in the market.

SUMMARY

A primary object of the present invention is to provide an unlocking method of a touch screen and an electronic device with camera function thereof, so as to directly display a screen of a specific function after a user unlocks the touch screen. Thus, the convenience for using the electronic device is improved.

According to an object of the present invention, an electronic device with camera function is disclosed, comprising a camera module, a touch screen and a processing module. The camera module captures an image. The touch screen displays at least one application function icon, a shooting mode icon, an activate area and a slide path connecting the at least one application function icon and the shooting mode icon with the activate area during a locking mode. The processing module is electrically connected to the camera module and the touch screen. While detecting that the at least one application function icon or the shooting mode icon is dragged to the activate area through the slide path, the processing module issues an unlocking signal to the touch screen. The touch screen enters an unlocking mode and displays a screen of application function operation or a screen of camera function according to the unlocking signal.

According to an object of the present invention, an unlocking method of a touch screen is further disclosed, comprising the following steps: using a touch screen for displaying at least one application function icon, a shooting mode icon, an activate area and a slide path connecting the at least one application function icon and the shooting mode icon with the activate area during a locking mode; issuing an unlocking signal to the touch screen by a processing module while the processing module detects that the at least one application function icon or the shooting mode icon is dragged to the activate area through the slide path; and enabling the touch screen for entering an unlocking mode and displaying a screen of application function operation or a screen of camera function according to the unlocking signal.

In the present invention, while detecting that the at least one application function icon or the shooting mode icon is touched during the locking mode, the processing module issues a corresponding display signal to the touch screen. The touch screen correspondingly displays the at least one application function icon or the shooting mode icon in the activate area according to the corresponding display signal.

In the present invention, while detecting that the at least one application function icon or the shooting mode icon is touched during the locking mode, the processing module issues a direction display signal to the touch screen. The touch screen displays a direction icon in the slide path according to the direction display signal.

The electronic device with camera function of the present invention further comprises a motion detection unit for detecting a rotate angle of the touch screen. The processing module rotates the at least one application function icon and the shooting mode icon according to a detecting result of the motion detection unit.

The unlocking method of the touch screen and the electronic device with camera function thereof according to the present invention have one or more of the following advantages:

(1) The unlocking method of the touch screen and the electronic device with camera function thereof make the screen be able to directly display a specific destination screen.

(2) The unlocking method of the touch screen and the electronic device with camera function thereof increase the convenience for users to use an electronic device.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
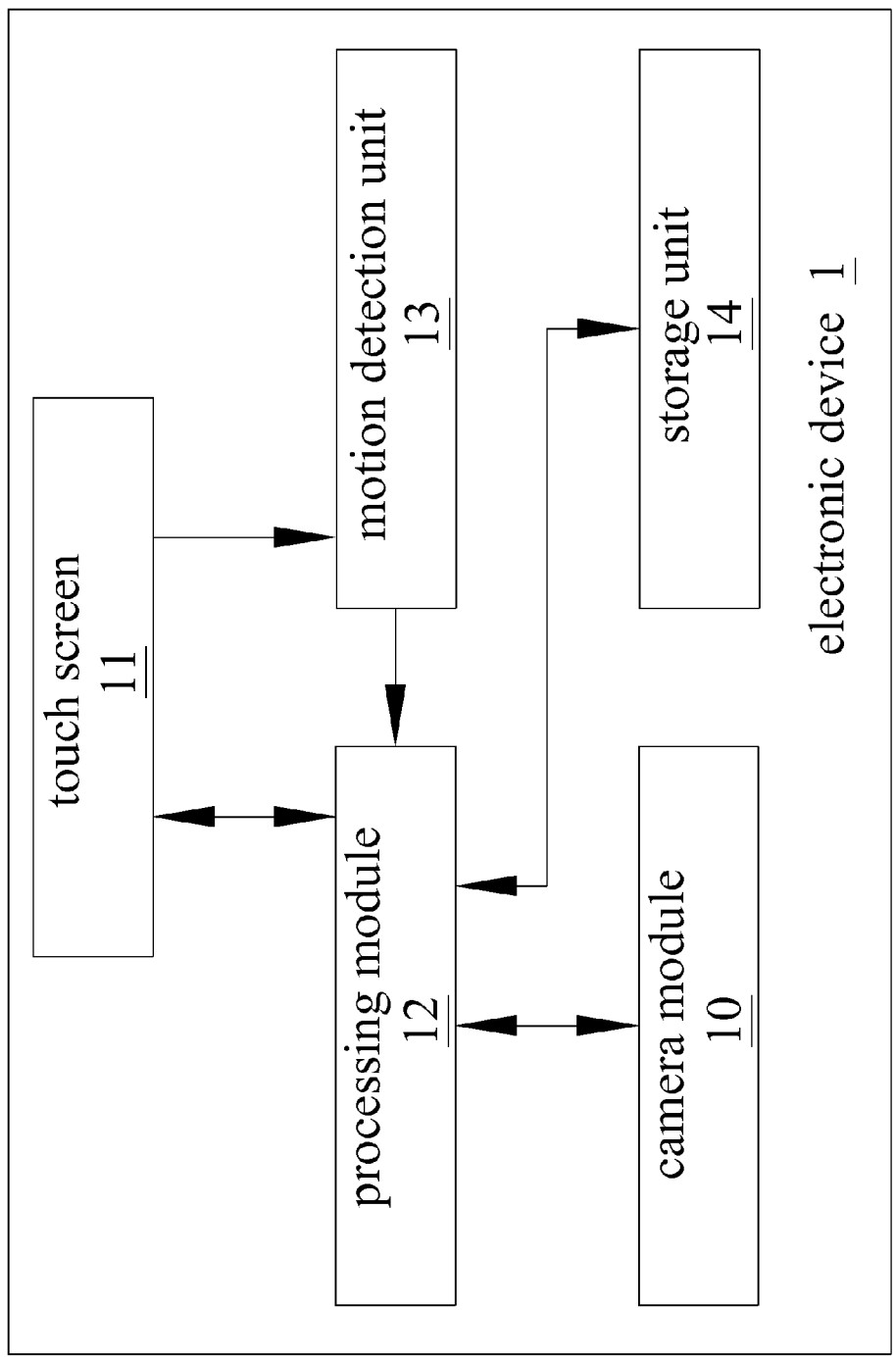
FIG. 1 is a block diagram of an electronic device with camera function according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Please refer to FIG. 1 that is a block diagram of an electronic device with camera function according to a first embodiment of the present invention. As shown, the electronic device 1 with camera function comprises a camera module 10, a touch screen 11, a processing module 12, a motion detection unit 13 and a storage unit 14. In addition, the electronic device with camera function may be a digital camera, a camera phone, a personal digital assistant (PDA), a digital video camera, and so on. The camera module 10 is used for capturing images and generating image data, and the camera module 10 may include a camera lens, a charge-coupled device (CCD) or complementary metal-oxide-semiconductor (CMOS), an analog/digital circuit, an image processor, and so on.

The touch screen 11 is provided for users to choose different functions through a touch method. While implementing the camera function, a user may see the shooting scene through the touch screen 11. Also, a taken picture can be displayed through the touch screen 11. The processing module 12 is electrically connected with the camera module 10, the touch screen 11, the motion detection unit 13 and the storage unit 14. The processing module 12 is mainly used for controlling the operation of the electronic device. The motion detection unit 13 is used for detecting the rotating condition of the touch screen 11, such as the rotating angle. The storage unit 14 is used for store the software programs or some data.

Figure 2:
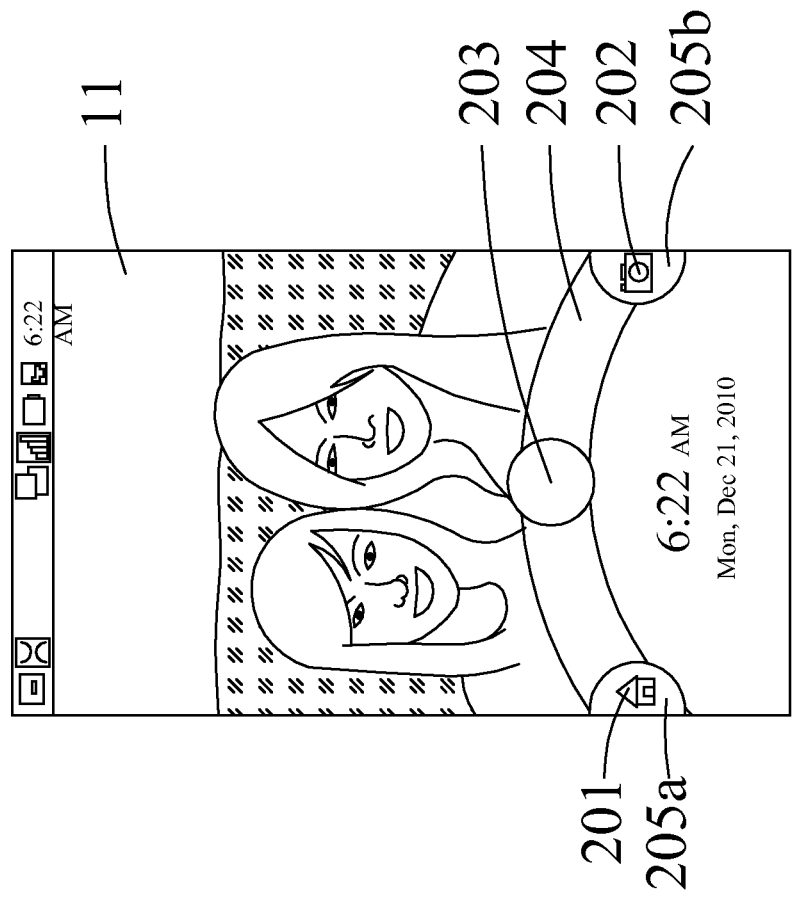
FIG. 2 is a schematic diagram of a touch screen of an electronic device with camera function according to a second embodiment of the present invention.

Please refer to FIG. 2 that is a schematic diagram of a touch screen of an electronic device with camera function according to a second embodiment of the present invention. As shown, while the touch screen 11 of the electronic device 1 is in a locking mode, the touch screen 11 displays an application function icon 201, a shooting mode icon 202, an activate area 203 and a slide path 204 connecting the application function icon 201, the shooting mode icon 202 and the activate area 203. In addition, the relative positions from left to right of the application function icon 201, the shooting mode icon 202 and the activate area 203 in the slide path are sequentially disposed by the application function icon 201, the activate area 203 and the shooting mode icon 202 (see FIG. 2); but not limited to, for example, the relative positions in the slide path from left to right may be sequentially disposed by the shooting mode icon 202, the activate area 203 and the application function icon 201 are (not shown in the figure). Besides, the position of the icons and the area in the touch screen 11 may be disposed in other forms according to the requirement of the design.

The touch screen 11 further comprises a first sensing zone 205a and a second sensing zone 205b. As shown in FIG. 2, the application function icon 201 is located in the first sensing zone 205a, and the shooting mode icon 202 is located in the second sensing zone 205b. In another embodiment, the application function icon 201 may be located in the second sensing zone 205b, and the shooting mode icon 202 may be located in the first sensing zone 205a (not shown in the figure).

In order to grant users quick access to the shooting mode when taking a picture, and to prevent missing the picture taking moment, the touch screen 11 of electronic device 1 has a shooting mode icon 202 of the present invention so that the user can activate the picture taking function quickly. In addition, the electronic device 1 with camera function usually supports many different application functions. Take a camera phone as an example, common functions of mobile phone include calling, text message, alarm clock, internet surfing, receiving and sending e-mail, calculator, multimedia entertainment, and so on. Hence, the application function icon 201 may be a main menu icon (see FIG. 2) for users to access the screen of main menu rapidly. However, this is not the only option. For example, the application function icon 201 may be a calling icon, a text message icon, an alarm clock icon, an internet surfing icon, an e-mail icon, a calculator icon, a multimedia entertainment icon, and so on.

It is worth noting that the content of the application function icon 201 of the electronic device 1 is changeable based upon the preference of the user. For example, a user may replace a main menu icon by a calling icon in the application function icon 201 of the electronic device 1.

Figure 3A:
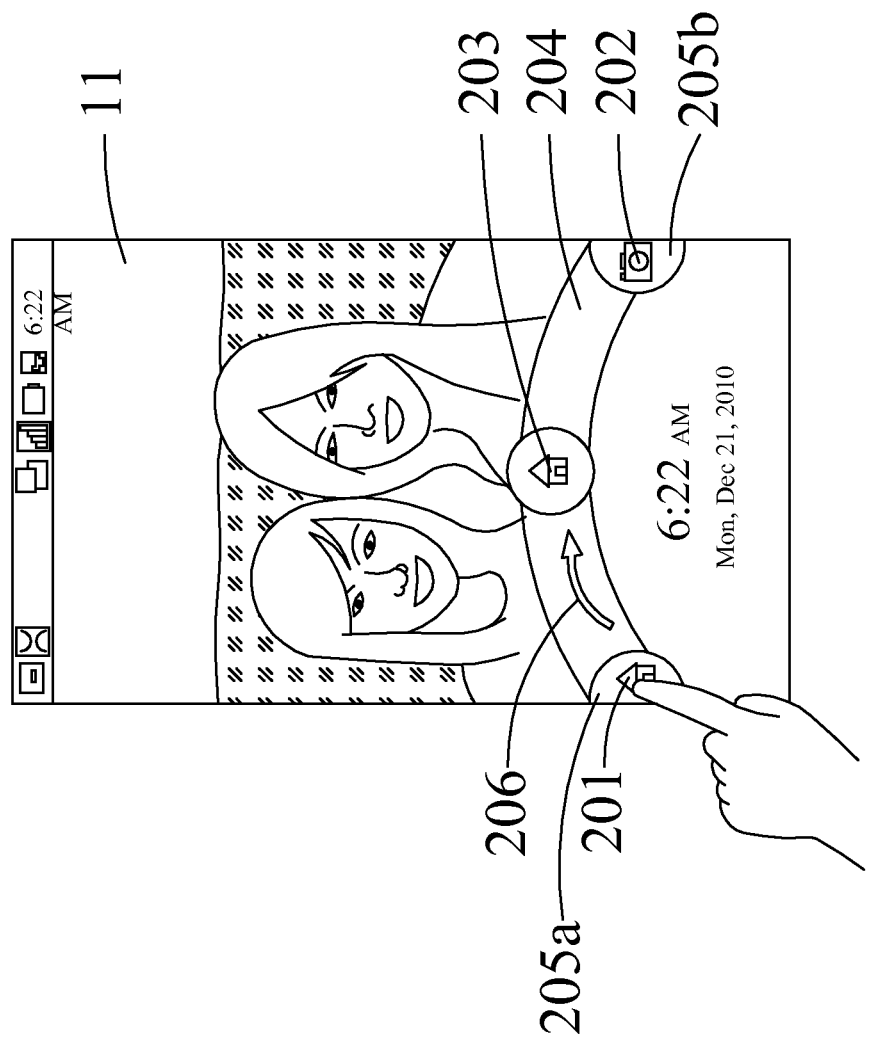
FIG. 3A is a schematic diagram of a first unlocking method of an electronic device with camera function according to the second embodiment of the present invention.
Figure 3B:
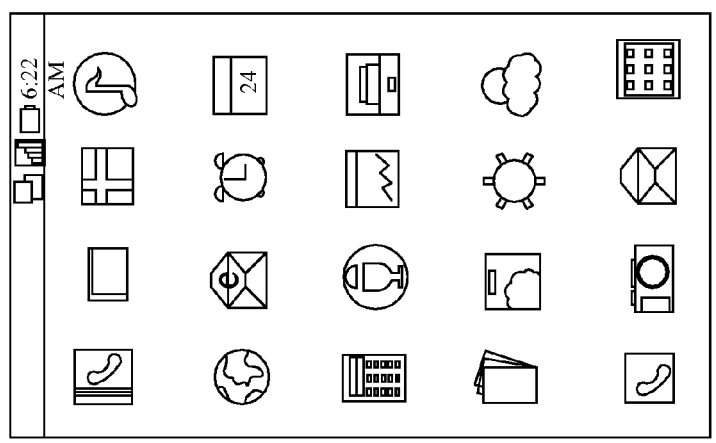
FIG. 3B is a schematic diagram showing a main menu of an electronic device with camera function according to the second embodiment of the present invention.

Please refer to FIG. 3A and FIG. 3B. FIG. 3A is a schematic diagram of a first unlocking method of an electronic device with camera function according to the second embodiment of the present invention; FIG. 3B is a schematic diagram showing a main menu of an electronic device with camera function according to the second embodiment of the present invention. While the touch screen 11 is in a locking mode, a user touches the application function icon 201 in the first sensing zone 205a. The touch screen 11 would issue a first touch signal to the processing module 12. Soon, the processing module 12 issues a corresponding display signal to the touch screen 11 according to the first touch signal. The touch screen 11 correspondingly displays the application function icon 201 in the activate area 203 according to the corresponding display signal. The meantime, the processing module 12 further issues a direction display signal to the touch screen 11. The touch screen 11 displays a direction icon 206 in the slide path 204 according to the direction display signal.

Moreover, a user may drag the application function icon 201 to the activate area 203 through the slide path 204. While detecting that the application function icon 201 is dragged to the activate area 203 through the slide path 204, the processing module 12 issues a first unlocking signal to the touch screen 11. The touch screen 11 enters an unlocking mode and displays a screen of application function operation according to the first unlocking signal. Specifically, take camera phone as an example, the application function icon 201 may be a main menu icon (see FIG. 3A). While the touch screen 11 is in a locking mode, a user touches the main menu icon 201 in the first sensing zone 205a. The touch screen 11 displays the main menu icon 201 in the activate area 203 and a direction icon 206, such as an arrow, in the slide path 204 between the activate area 203 and the first sensing zone 205a. Next, a user may drag the main menu icon 201 from the first sensing zone 205a to the activate area 203 through the slide path 204 according to the direction pointed by the arrow. The touch screen 11 is switched to an unlocking mode from a locking mode, and displays the main menu screen. Then, the user can choose the desired application function from the main menu screen.

Figure 4A:
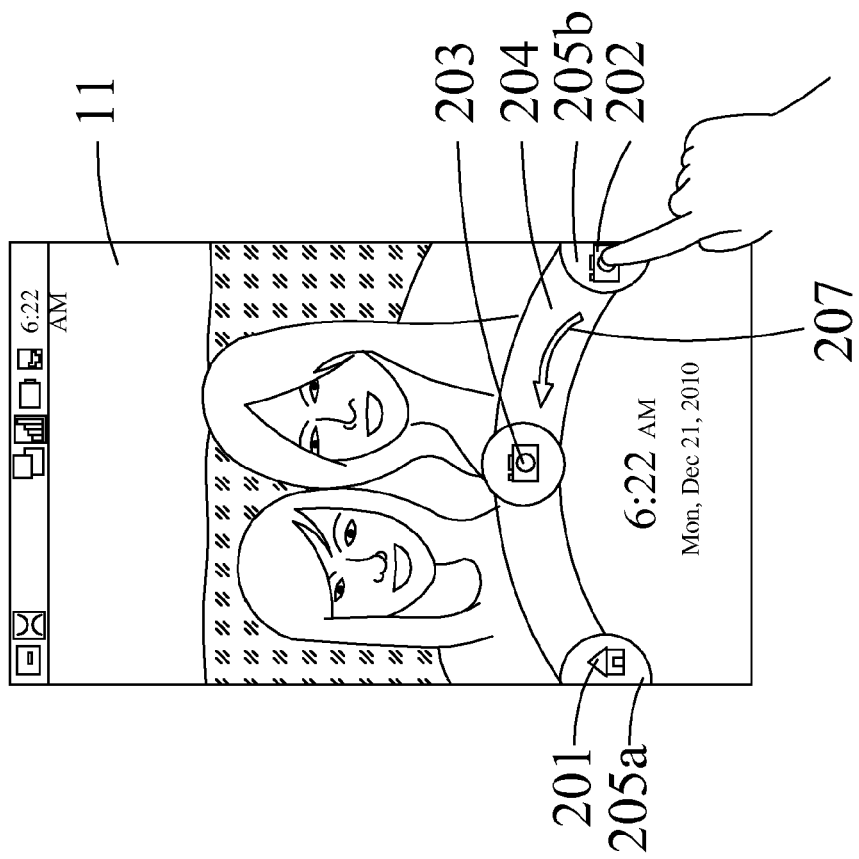
FIG. 4A is a schematic diagram of a second unlocking method of an electronic device with camera function according to the second embodiment of the present invention.
Figure 4B:
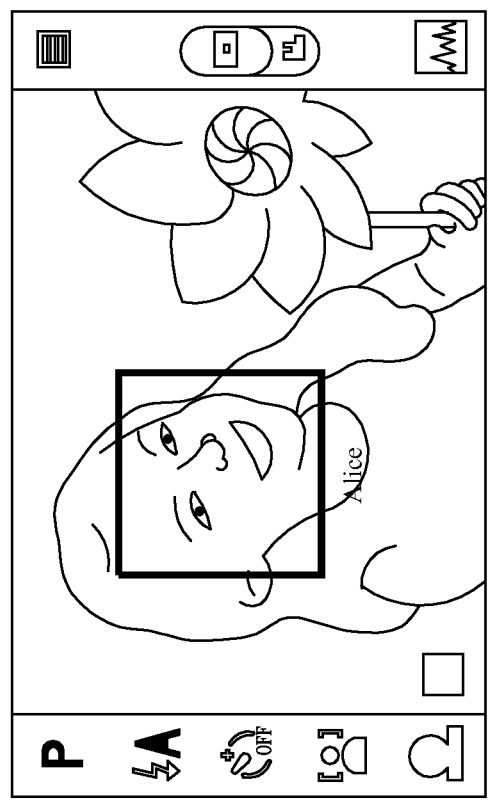
FIG. 4B is a schematic diagram showing a shooting mode of an electronic device with camera function according to the second embodiment of the present invention.

Please refer to FIG. 4A and FIG. 4B. FIG. 4A is a schematic diagram of a second unlocking method of an electronic device with camera function according to the second embodiment of the present invention; FIG. 4B is a schematic diagram showing a shooting mode of an electronic device with camera function according to the second embodiment of the present invention. While the touch screen 11 is in a locking mode, a user touches the shooting mode icon 202 in the second sensing zone 205b. The touch screen 11 would issue a second touch signal to the processing module 12. Soon, the processing module 12 issues a corresponding display signal to the touch screen 11 according to the second touch signal. The touch screen 11 correspondingly displays the shooting mode icon 202 in the activate area 203 according to the corresponding display signal. The meantime, the processing module 12 further issues a direction display signal to the touch screen 11. The touch screen 11 displays a direction icon 207 in the slide path 204 according to the direction display signal. As shown in FIG. 4A, the touch screen 11 displays the direction icon 207, such as an arrow, in the slide path 204 between the activate area 203 and the second sensing zone 205b.

Furthermore, if a user wants that the touch screen 11 directly switches to a screen of camera function from a locking mode, the user may drag the shooting mode icon 202 from the second sensing zone 205b to the activate area 203 through the slide path 204 according to the direction pointed by the arrow. While detecting that the shooting mode icon 202 is dragged to the activate area 203 through the slide path 204, the processing module 12 issues a second unlocking signal to the touch screen 11. The touch screen 11 enters an unlocking mode and displays a screen of camera function according to the second unlocking signal (see FIG. 4B). The meantime, the processing module 12 further issues an activation signal to the camera module 10 to activate the camera module 10. Soon, the user can start to take pictures instantly.

Figure 5:
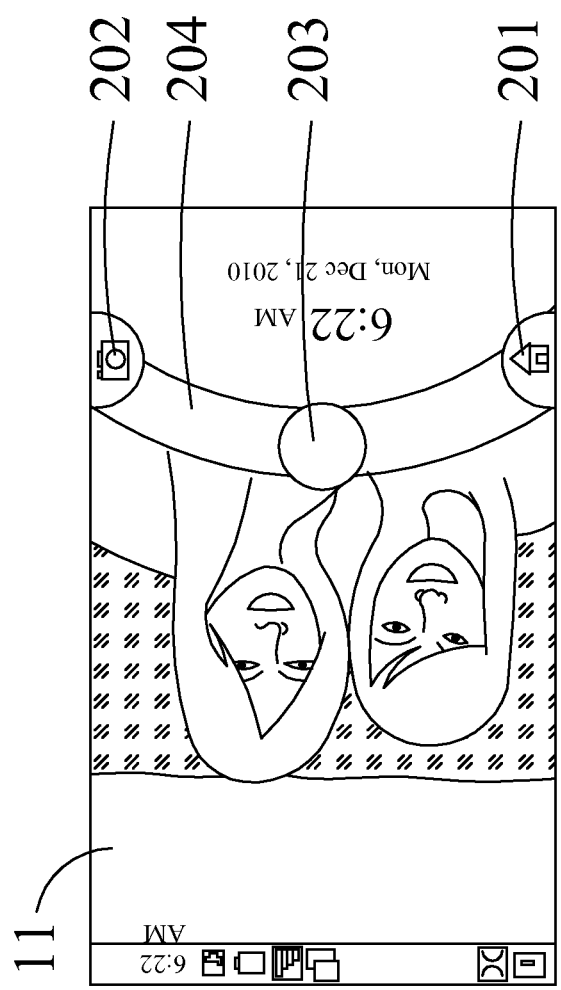
FIG. 5 is a schematic diagram showing a landscape orientation of a touch screen according to the second embodiment of the present invention.

Please refer to FIG. 5 that is a schematic diagram showing a landscape orientation of a touch screen according to the second embodiment of the present invention. As shown, the electronic device 1 with camera function according to the present invention comprises a motion detection unit 13. The processing module 12 may rotate the application function icon 201 and the shooting mode icon 202 according to a detecting result from the motion detection unit 13. For example, the orientation of the touch screen 11 is portrait orientation (see FIG. 3A or 4A); then, the application function icon 201 and the shooting mode icon 202 here are both portrait orientation. As shown in FIG. 5, the orientation of the touch screen 11 is changed from the portrait orientation to the landscape orientation while the touch screen 11 is counter-clockwise rotated 90 degrees. Accordingly, the processing module 12 changes the application function icon 201 and the shooting mode icon 202 from the portrait orientation to the landscape orientation for users' convenience.

In the embodiments mentioned above, the touch screen 11 comprises one application function icon 201. However, depending on different applications, the touch screen 11 may further comprise more than one application function icon. For example, besides the shooting mode icon and the main menu icon, the touch screen may further comprise a calling icon. There is another slide path connecting the calling icon and the activate area 203. Similarly, if a user wants to use a phone function when the touch screen 11 is a locking mode, the user may first touch the calling icon. Soon, the processing module 12 issues a corresponding display signal to the touch screen 11 to correspondingly display the calling icon in the activate area 203. Meanwhile, the processing module 12 issues a direction display signal to the touch screen 11 to display a direction icon in the slide path. Then, the user drags the calling icon to the activate area 203 through the slide path according to the direction pointed by the direction icon. The processing module 12 issues a corresponding unlocking signal to the touch screen 11; the touch screen 11 enters an unlocking mode and displays a screen of calling operation according to the corresponding unlocking signal.

Figure 6:
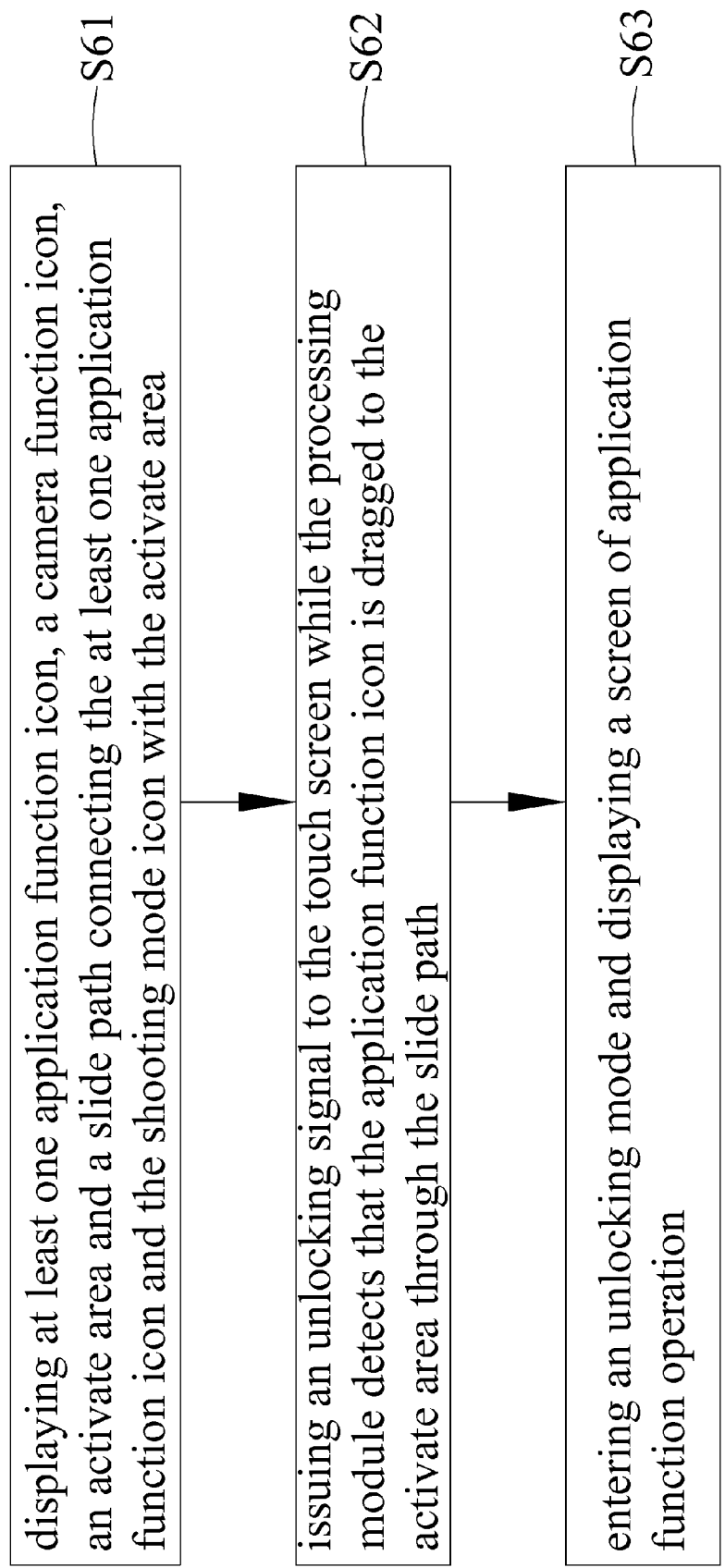
FIG. 6 is a flowchart of an unlocking method of a touch screen in accordance with one embodiment of the present invention.

FIG. 6 is a flowchart of an unlocking method of a touch screen in accordance with one embodiment of the present invention. Please refer to FIG. 6, the unlocking method of a touch screen comprises the follow steps of: (S61) using a touch screen for displaying at least one application function icon, a shooting mode icon, an activate area and a slide path connecting the at least one application function icon and the shooting mode icon with the activate area during a locking mode; (S62) issuing an unlocking signal to the touch screen by a processing module while the processing module detects that the application function icon is dragged to the activate area through the slide path; and (S63) enabling the touch screen for entering an unlocking mode and displaying a screen of application function operation according to the unlocking signal.

Figure 7:
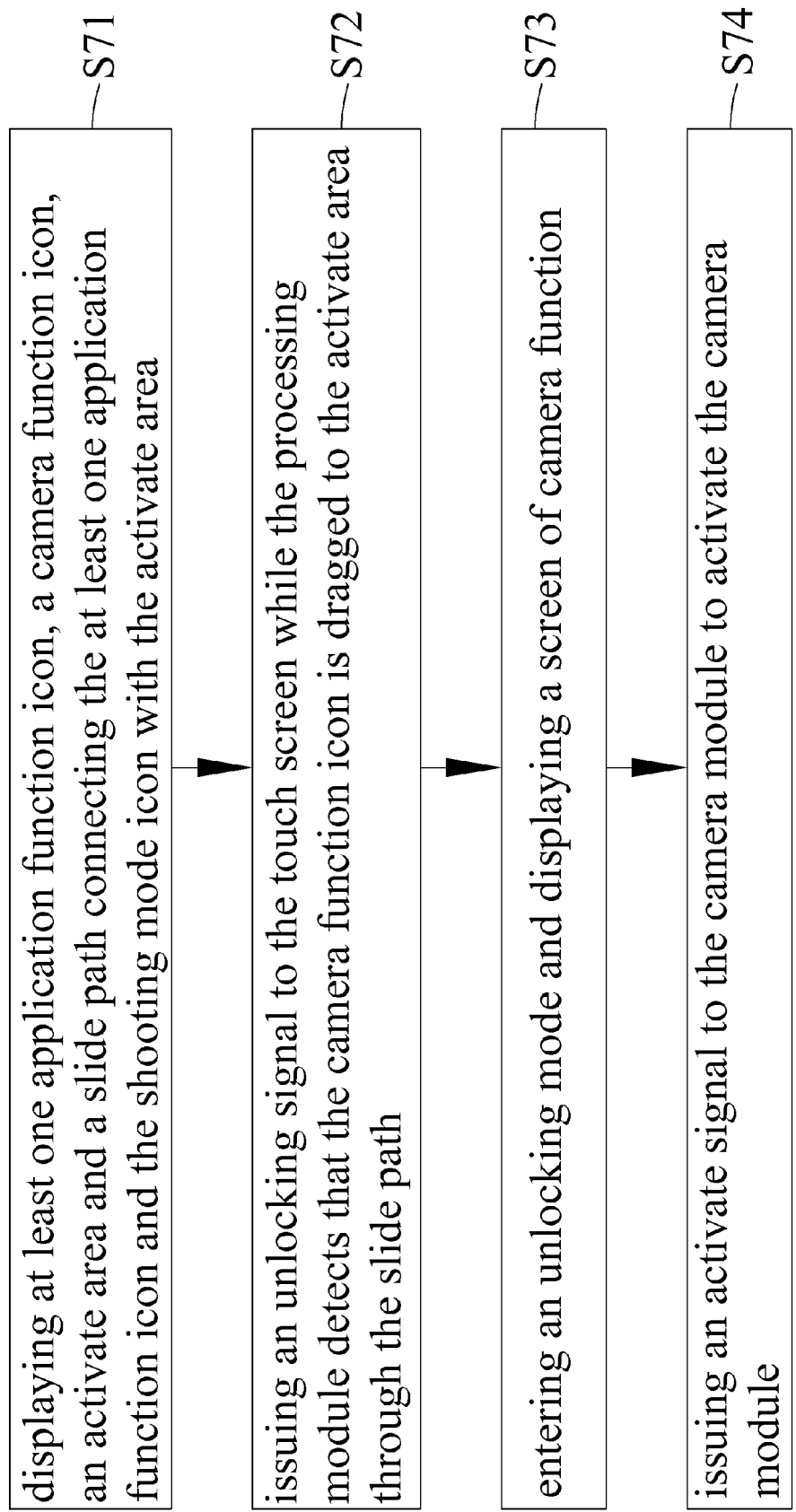
FIG. 7 is a flowchart of an unlocking method of a touch screen in accordance with another embodiment of the present invention.

FIG. 7 is a flowchart of an unlocking method of a touch screen in accordance with another embodiment of the present invention. Please refer to FIG. 7, the unlocking method of a touch screen comprises the follow steps of: (S71) using a touch screen for displaying at least one application function icon, a shooting mode icon, an activate area and a slide path connecting the at least one application function icon and the shooting mode icon with the activate area during a locking mode; (S72) issuing an unlocking signal to the touch screen by a processing module while the processing module detects that the shooting mode icon is dragged to the activate area through the slide path; (S73) enabling the touch screen for entering an unlocking mode and displaying a screen of camera function according to the unlocking signal; and (S74) issuing an activate signal to the camera module by the processing module to activate the camera module.

With the above-described unlocking method of a touch screen and the electronic device with camera function thereof, it would be able to make the screen directly display a specific destination screen and increase the convenience for users to use the electronic device.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. An electronic device with camera function, comprising:
    a camera module capturing an image;
    a touch screen displaying at least one application function icon in a first sensing zone, a shooting mode icon in a second sensing zone, an activate area between the first sensing zone and the second sensing zone and a slide path connecting the at least one application function icon in the first sensing zone and the shooting mode icon in the second sensing zone with the activate area during a locking mode; and a processing module being electrically connected to the camera module and the touch screen; the processing module issuing an unlocking signal to the touch screen only when the at least one application function icon in the first sensing zone or the shooting mode icon in the second sensing zone is dragged to the activate area between the first sensing zone and the second sensing zone through the slide path; the touch screen entering an unlocking mode and displaying a screen of application function operation or a screen of camera function according to the unlocking signal accordingly;

wherein only when the at least one application function icon in the first sensing zone or the shooting mode icon in the second sensing zone is touched during the locking mode, the processing module issues a corresponding display signal to the touch screen; the touch screen correspondingly displays the other one of the at least one application function icon or the shooting mode icon in the activate area between the first sensing zone and the second sensing zone according to the corresponding display signal.

2. The electronic device with camera function as recited in claim 1, wherein while detecting that the at least one application function icon or the shooting mode icon is touched during the locking mode, the processing module issues a direction display signal to the touch screen; the touch screen displays a direction icon in the slide path according to the direction display signal.

3. The electronic device with camera function as recited in claim 1, further comprising a motion detection unit for detecting a rotate angle of the touch screen; the processing module rotating the at least one application function icon and the shooting mode icon according to a detecting result of the motion detection unit.

4. The electronic device with camera function as recited in claim 1, wherein while detecting that the shooting mode icon is dragged to the activate area through the slide path, the processing module further issuing an activate signal to the camera module to activate the camera module.

5. An unlocking method of a touch screen, comprising the following steps:

using a touch screen for displaying at least one application function icon in a first sensing zone, a shooting mode icon in a second sensing zone, an activate area between the first sensing zone and the second sensing zone and a slide path connecting the at least one application function icon in the first sensing zone and the shooting mode icon in the second sensing zone with the activate area during a locking mode;

issuing an unlocking signal to the touch screen by a processing module only when the at least one application function icon in the first sensing zone or the shooting mode icon in the second sensing zone is dragged to the activate area between the first sensing zone and the second sensing zone through the slide path; and enabling the touch screen for entering an unlocking mode and displaying a screen of application function operation or a screen of camera function according to the unlocking signal;

wherein while the touch screen is in the locking mode, the method further comprises the following steps:

issuing a corresponding display signal from the processing module to the touch screen only when the at least one application function icon in the first sensing zone or the shooting mode icon in the second sensing zone is touched; and using the touch screen for correspondingly displaying the other one of the at least one application function icon or the shooting mode icon in the activate area between the first sensing zone and the second sensing zone according to the corresponding display signal.

6. The unlocking method of the touch screen as claimed in claim 5, wherein while the touch screen is in the locking mode, the method further comprises the following steps:

issuing a direction display signal from the processing module to the touch screen while the processing module detects that the at least one application function icon or the shooting mode icon is touched; and using the touch screen for displaying a direction icon in the slide path according to the direction display signal.

7. The unlocking method of the touch screen as claimed in claim 5, further comprising the following step:

using a motion detection unit for detecting a rotate angle of the touch screen; and rotating the at least one application function icon and the shooting mode icon through the processing module according to a detecting result of the motion detection unit.

8. The unlocking method of the touch screen as claimed in claim 5, wherein while the processing module detects that the shooting mode icon is dragged to the activate area through the slide path, the method further comprises the following step:

issuing an activate signal to the camera module by the processing module to activate the camera module.

* * * * *